US012754493B2

(12) United States Patent
Kaziev et al.

(10) Patent No.: US 12,754,493 B2
(45) Date of Patent: Oct. 6, 2026

(54) LIGHT EMITTING MEMBERS

(71) Applicant: HEWLETT-PACKARD DEVELOPMENT COMPANY, L.P., Spring, TX (US)

(72) Inventors: Boris Kaziev, Ness Ziona (IL); Yuval Efrath, Ness Ziona (IL); Daniel Shafer, Ness Ziona (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 19/103,708

(22) PCT Filed: Aug. 17, 2022

(86) PCT No.: PCT/US2022/040594

§ 371 (c)(1),
(2) Date: Feb. 13, 2025

(87) PCT Pub. No.: WO2024/039366

PCT Pub. Date: Feb. 22, 2024

(65) Prior Publication Data

US 2026/0050230 A1 Feb. 19, 2026

(51) Int. Cl.
*G03G 15/043* (2006.01)
*G03G 15/00* (2006.01)
(Continued)

(52) U.S. Cl.
CPC ....... *G03G 15/043* (2013.01); *G03G 15/0266* (2013.01); *G03G 15/04054* (2013.01);
(Continued)

(58) Field of Classification Search
CPC ......... G03G 15/0266; G03G 15/04054; G03G 15/043; G03G 15/161; G03G 15/162; G03G 15/5037; G03G 2215/0409
See application file for complete search history.

(56) References Cited

U.S. PATENT DOCUMENTS 4,791,452 A * 12/1988 Kasai .................... G03G 15/08 358/300
5,966,560 A 10/1999 Kodama et al.
(Continued)

FOREIGN PATENT DOCUMENTS

EP 1109076 A2 6/2001
EP 1942384 A1 7/2008
(Continued)

OTHER PUBLICATIONS

Machine translation of JP 2004-252203 publicated on Sep. 9, 2004.*
Machine translation of JP 2004-252203 (Year: 2004).*

*Primary Examiner* — Sophia S Chen
(74) *Attorney, Agent, or Firm* — Jordan IP Law, LLC

(57) ABSTRACT

According to an example, a conditioning device includes a first light emitting member to emit light towards a first segment of a path and a second light emitting member to emit light towards a second segment of a path. The first segment of the path is upstream an engagement point of the path at which the photoconductive surface is to contact a subsequent transfer member and the second region is downstream the engagement point. The light emitted by the first light emitting member is to set the photoconductive surface at a pre-transfer voltage and the light emitted by the second light emitting member is to set the photoconductive surface at a post-transfer voltage greater than the pre-transfer voltage.

14 Claims, 4 Drawing Sheets

(51) Int. Cl.
*G03G 15/02* (2006.01)
*G03G 15/04* (2006.01)
*G03G 15/16* (2006.01)

(52) U.S. Cl.
CPC ......... *G03G 15/161* (2013.01); *G03G 15/162* (2013.01); *G03G 15/5037* (2013.01); *G03G 2215/0409* (2013.01)

(56) References Cited

U.S. PATENT DOCUMENTS

| | | | | |
|---|---|---|---|---|
| 6,245,402 | B1 | 6/2001 | Schlueter et al. | |
| 2008/0159783 | A1 | 7/2008 | Jung et al. | |
| 2010/0008687 | A1 | 1/2010 | Ishii | |
| 2019/0265625 | A1* | 8/2019 | Okubo | G03G 15/0266 |
| 2019/0354043 | A1* | 11/2019 | Odagiri | G03G 15/5037 |
| 2020/0310275 | A1* | 10/2020 | Kanai | G03G 15/043 |

FOREIGN PATENT DOCUMENTS

| | | | |
|---|---|---|---|
| JP | 63-058482 | A | 3/1988 |
| JP | 2002-258555 | A | 9/2002 |
| JP | 2004-252203 | A | 9/2004 |

* cited by examiner

LIGHT EMITTING MEMBERS

BACKGROUND

Liquid electro-photography (LEP) printing systems form images on substrates by transferring printing fluid profiles to the substrates. To obtain the printing fluid profile, a photoconductive surface (e.g., a photoconductive plate) is uniformly charged and selectively discharged. Subsequently, printing fluids are selectively transferred to the photoconductive surface based on a voltage difference, thereby creating a printing fluid profile on the photoconductive surface. Upon the printing fluid profile is created, the printing fluid profile is transferred to a subsequent transfer element (e.g., an intermediate element or a printing substrate). In some examples, light emitting members may be used for discharging the photoconductive surface.

BRIEF DESCRIPTION OF DRAWINGS

Features of the present disclosure are illustrated by way of example and are not limited in the following figure(s), in which like numerals indicate like elements, in which.

DETAILED DESCRIPTION

Figure 1:
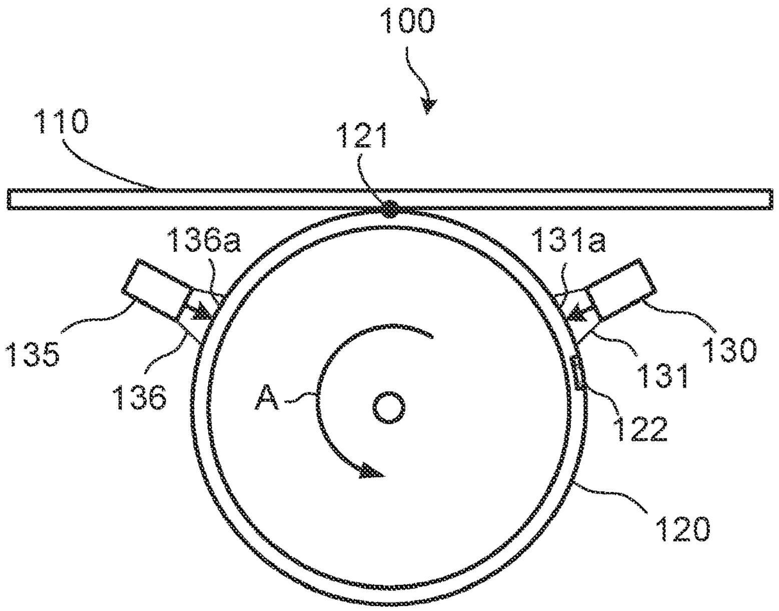
FIG. 1 shows a schematic drawing illustrating a printing system comprising a first light emitting member and a second light emitting member, according to an example of the present disclosure.

For simplicity and illustrative purposes, the present disclosure is described by referring mainly to examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Throughout the present disclosure, the terms “a” and “an” are intended to denote at least one of a particular element. As used herein, the term “includes” means includes but not limited to, the term “including” means including but not limited to. The term “based on” means based at least in part on.

Liquid electro-photography (LEP) printing systems are used to generate images by transferring a printing fluid profile associated with the image to a printing substrate. To generate the printing fluid profile, a surface of the photoconductive element is electrically charged, selectively discharged, and then, printing fluid developers (e.g., binary ink developers) selectively transfer printing fluids to the surface of the photoconductive element. Once the printing fluid profile is generated on the photoconductive element, the printing fluid profile is transferred to a subsequent transfer element such as an intermediate transfer member or a printing substrate.

Liquid electro-photography (LEP) printing systems comprise charging elements to electrically charge a photoconductive surface (e.g., a photoconductive sleeve or a photoconductive drum). In particular, charging elements may be used to uniformly (or selectively) charge or discharge regions on the photoconductive surface. In some examples, the photoconductive surface may have a continuous surface, and charging and discharging operations may be conducted multiple times over the same transfer operation. In an example, the printing system may comprise a charging member in the form of a charging roller to uniformly charge a surface of a photoconductive element of an LEP printing system at a reference voltage (for instance, −800 V). Then, once the photoconductive surface is at the reference voltage, a discharging element (e.g., a writing head) may be used to selectively discharge specific regions of the surface of the photoconductive element. Afterward, a binary ink developer of the LEP printing system such as a developing unit develops an electrically charged printing fluid. Then, the printing fluid is transferred from the developing unit to a region of the photoconductive element based on a voltage difference between the region and the electrical charge of the printing fluid. If the voltage difference exceeds a voltage threshold difference, the printing fluid is repelled from such charged regions. By subsequently engaging and disengaging other developing units of the LEP printing system, the printing fluid profile associated with the image is obtained on the surface of the photoconductive element. Then, once the printing fluid profile is ready, the printing fluid profile is transferred to the printing substrate or any other intermediate elements belonging to the printing system.

As used herein, “printing fluid” refers generally to any substance that can be applied upon a substrate by a printing system during a printing operation, including but not limited to inks, electro-inks, primers, and overcoat materials (such as a varnish), water, and solvents other than water.

When transferring a printing fluid profile from a photoconductive surface to the subsequent transfer member, the voltage differences between the photoconductive surface and the subsequent transfer member may result in an electric arc. In particular, if a voltage difference exceeds a voltage value (e.g., 50 V in absolute value), an electric current of high intensity may be generated. In some examples, the electric current may damage the surface of the photoconductive surface, thereby leading to an early replacement of the photoconductive surface and a reduction of the throughput. In other examples, the electric arc may negatively impact the transfer of the printing fluid profile to the subsequent transfer element, thereby resulting in image quality defects.

According to some examples, contact between the subsequent transfer member and the photoconductive element may result in a local discharge of the photoconductive surface. In an example, a local discharge may be caused by the presence of foreign materials in at least one of the photoconductive surface and the subsequent transfer member. In some examples, some printing fluid particles present on the photoconductive surface may locally discharge a region of the photoconductive surface. In other examples, particles present on a surface of the subsequent transfer member may result in a voltage variation across regions of the photoconductive surface. In some other examples, the subsequent transfer member may include regions made of different materials having different electric conductivities. Hence, due to the different electric conductivities, the photoconductive surface may be locally discharged depending on the conductivity of the regions of the subsequent transfer member where the transfer from the photoconductive surface and the subsequent transfer member takes place.

As a result of local discharges resulting from contact between photoconductive surfaces and subsequent transfer members, the photoconductive surface may be charged at a non-uniform voltage profile. The non-uniform voltage profile, in some examples, may result in a non-effective printing fluid transfer in a subsequent ink developing operation. In an example, electrically charged printing fluids may not be effectively transferred to the desired regions of the photoconductive element because of the non-uniform voltage.

Disclosed herein are examples of printing systems, conditioning devices, and methods for reducing the local discharges experienced when using photoconductive surfaces to contact subsequent transfer members.

According to an example, an electrical charge of at least one of the subsequent transfer member and the photoconductive surface may be modified to reduce a voltage difference between both elements below a threshold voltage value associated with the appearance of an electric arc. However, even if the electric arc is prevented, the contact between the photoconductive surface and the subsequent transfer member may result in a local discharge of regions of the photoconductive surface. In an example, a pre-transfer erase element may be used to modify a voltage of the photoconductive surface before contact between the photoconductive element and the subsequent transfer member so as to reduce a voltage difference between both elements. In addition, to compensate for the non-uniform voltage associated with local discharges, a post-transfer erase element may be used to modify a voltage of the photoconductive surface after contact between the photoconductive surface and the subsequent transfer member.

In some examples, the photoconductive element may be in the form of a cylindrical photoconductive sleeve, and a transfer operation for obtaining a printed job of 10 meters in length using a sleeve having a photoconductive surface having a length of 760 mm (i.e., the perimeter of the photoconductive sleeve is 760 mm) may involve approximately 13 revolutions. In some examples, the photoconductive sleeve may rotate at 2.15 m/s.

As used herein, the term “photoconductive surface” and “photoconductive element” refer to elements including surfaces made of a film of photoconductive material. In some examples, a photoconductive surface may be in the form of a photoconductive sleeve having a cylindrical shape and including a film of conductive material on an external surface. In some other examples, the photoconductive surface may be a photoconductive drum. In some examples, the film of photoconductive material of a photoconductive sleeve may be made of aluminum.

In some examples, printing systems may use photoconductive surfaces having continuous photoconductive surfaces so as to reduce the overall dimensions of the printing system and increase the throughput of the printing system. As a result, in the same printing operation, multiple charging/discharging operations may be conducted on the photoconductive surface. In an example, the photoconductive surface may be movable along a continuous path and, as the photoconductive surface moves through the path, charging and discharging elements may modify a voltage of the photoconductive surface.

Throughout the description, the term “path” will be used to refer to a course in which an element or object, e.g., a photoconductive surface, is to move or traverse. In some examples, the photoconductive surface may comprise a continuous surface and the path may be referred to as a continuous path. In other examples, the photoconductive surface may be in the form of a rotatable photoconductive surface (e.g., a photoconductive sleeve), and the path may be referred to as a rotation path.

According to an example, a printing system comprises an intermediate transfer member, a photoconductive sleeve arranged to contact the intermediate transfer member at an engagement point, a first light emitting member arranged to project light onto a first segment of a path for rotation of the photoconductive sleeve, and a second light emitting member arranged to project light onto a second segment of the path. The first segment on which the first light emitting member is located upstream the engagement point and the second segment on which the second light emitting member is located downstream the engagement point. As the photoconductive sleeve rotates, the first light emitting member is to set a photoconductive region of the photoconductive sleeve at a pre-transfer voltage and the second light emitting member is to set the photoconductive region at a post-transfer voltage greater than the pre-transfer voltage.

Referring now to FIG. 1, a printing system 100 including a first light emitting member 130 and a second light emitting member 135 is shown. The printing system 100 further comprises an intermediate transfer member 110 and a photoconductive sleeve 120 arranged to contact the intermediate transfer member 110 at an engagement point 121. For illustrative purposes, other components of the printing system 100 have been omitted. For example, the components used for generating the printing fluid profile on a photoconductive surface of the photoconductive sleeve have been omitted. In some examples, the printing fluid profile is transferred to the intermediate transfer member 110 at the engagement point 121 where the photoconductive sleeve 120 contacts the intermediate transfer member. In some other examples, the photoconductive sleeve 120 may be supported by a photoconductive sleeve support of the printing system 100.

Light emitting members 130 and 135 may be used for modifying a voltage on regions of the photoconductive sleeve 120. In FIG. 1, a voltage on the photoconductive sleeve 120 is modified by emitting a first light beam 131 and a second light beam 136 towards the photoconductive sleeve 120. In particular, the first light emitting member 130 of FIG. 1 is arranged to project light (i.e., the first light beam 131) onto a first segment 131*a* of a path for rotation of the photoconductive sleeve 120 and the second light emitting member 135 is arranged to project light (i.e., the second light beam 136) onto a second segment 136*a* of the path.

In FIG. 1, the photoconductive 120 rotates along a path in a counterclockwise direction represented by arrow A. As the photoconductive sleeve 120 rotates, a photoconductive region 122 on the periphery of the photoconductive sleeve 120 will reach at first the first segment 131*a* where the first light emitting member 130 is projecting light. Over the first segment 131*a*, the first light emitting member 130 sets the photoconductive region 122 at a pre-transfer voltage. Then, after the first segment 131*a*, the photoconductive region 122 will contact the intermediate transfer member 110 at the engagement point 121. In some examples, contact may result in a local discharge of regions of the photoconductive sleeve, thereby leading to a non-uniformly charged photoconductive sleeve. Then, after contact between the intermediate transfer member 110 and the photoconductive sleeve 120, the photoconductive region 122 will reach the second segment 136*a* where the second light emitting member 135 is projecting light. Over the second segment 136*a*, the second light emitting member 130 sets the photoconductive region 122 at a post-transfer voltage.

As a result of the light emitted towards the photoconductive sleeve 120 as the photoconductive sleeve 120 rotates, the first light emitting member 130 sets the photoconductive sleeve 120 at the pre-transfer voltage and the second light emitting member sets the photoconductive sleeve 120 at the post-transfer voltage. To compensate for the local discharges at the engagement point 121, the post-transfer voltage is greater than the pre-transfer voltage. In some examples, the pre-transfer voltage may be set such that an electric arc resulting from a voltage difference above a threshold voltage value is prevented. In some other examples, the post-transfer voltage may be set such that the local discharges are compensated while keeping the photoconductive sleeve 120 within admissible voltage ranges for the upcoming printing transfer operations. In an example, a voltage difference between the post-transfer voltage and the pre-transfer voltage may be less than 60 V. In some other examples, the voltage difference may be a voltage value within the range from 20 V to 50 V. In an example, the first light emitting member 130 may set the photoconductive sleeve 120 at a voltage within a range from −350 V to −320 V. In some other examples, the second light emitting member 135 may set the photoconductive sleeve 120 at a reference voltage such as −300 V.

In some examples, each of the first light emitting member 130 and the second light emitting member 135 may comprise a plurality of light emitting diodes arranged to emit light across a width of the photoconductive sleeve 120. In some examples, the first light emitting member 130 may comprise a first plurality of light emitting diodes to receive a first input voltage and the second light emitting member 135 may comprise a second plurality of light emitting diodes to receive a second input voltage, the second input voltage being greater than the first input voltage.

In some other examples, to set the photoconductive sleeve 120 at the pre-transfer voltage and the post-transfer voltage, the first light emitting member 130 is to emit a first light intensity and the second light emitting member 135 is to emit a second light intensity greater than the first light intensity. In some examples, the first and the second light intensities may be within a range from 400 to 1000 $\mu W/cm^2$. In some other examples, the second light intensity may be greater than 500 $\mu W/cm^2$.

Figure 2:
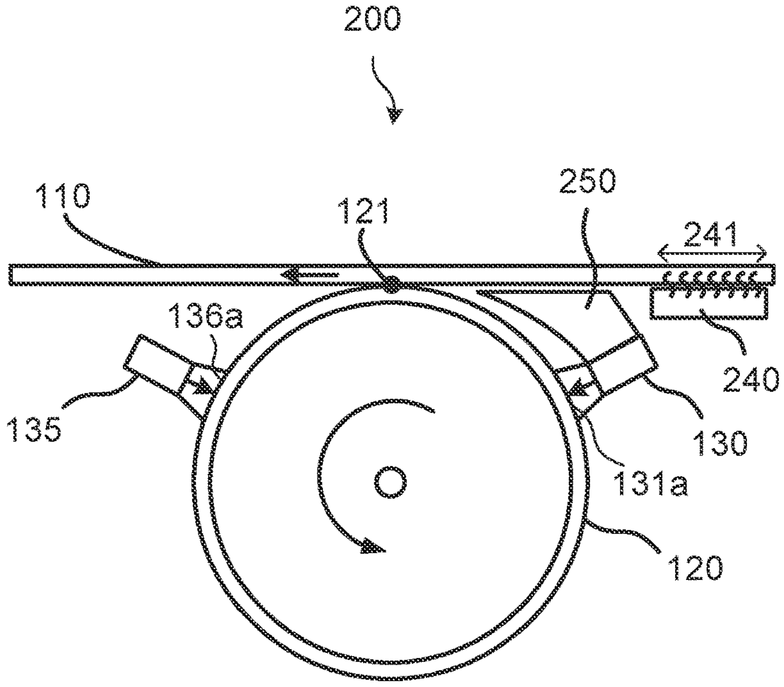
FIG. 2 shows a schematic drawing illustrating a printing system including a drying station and a shading member, according to an example of the present disclosure.

Referring now to FIG. 2, a printing system 200 including a drying station 240, and a shading member 250 is shown. The elements of the printing system 200 that have been explained in reference to the printing system 100 of FIG. 1 have been numbered using the same reference numerals. The printing system 200 comprises an intermediate transfer member 110, a photoconductive sleeve 120, a first light emitting member 130, and a second light emitting member 135. As previously explained, the photoconductive sleeve 120 contacts with the intermediate transfer member 110 at an engagement point 121, the engagement point 121 positioned downstream a first segment 131*a* of a path for rotation of the photoconductive sleeve 120 and upstream a second segment 136*a* of the path.

The drying station 240 of the printing system 200 is arranged to cure the intermediate transfer member 110 as the intermediate transfer member 110 moves along a curing region 241. In an example, the photoconductive sleeve 120 may receive part of the energy emitted by the drying station 240 as the drying station 240 cures the intermediate transfer member 110. In some examples, the energy emitted by the drying station 240 may modify an electric charge of the photoconductive sleeve 120. In an example, the use of the drying station may result in at least one of radiation and convection. For instance, as the drying station 240 cures the intermediate transfer member 110, radiant energy may reach the photoconductive sleeve 120. In other examples, air located nearby the drying station 240 may be heated by convection when the drying station 240 is in use. As a result of the radiation and/or convection, portions of the photoconductive sleeve 120 may modify its voltage, thereby leading to a non-uniformly charged photoconductive sleeve 120.

To reduce the voltage variation on the photoconductive sleeve 120 when using the drying station 240, the printing system 200 comprises the shading member 250. The shading member 250 is arranged in the printing system 200 such that the shading member 250 covers a shading segment defined from the first segment of the path 131*a* to the engagement point 121. The shading member 250 blocks radiation emitted by the drying station 240 towards the photoconductive sleeve 120. In some other examples, the shading member 250 may be made of a thermal insulation material so as to thermally insulate the photoconductive sleeve 120 with respect to the drying station 240 and the curing region 241.

Figure 3:
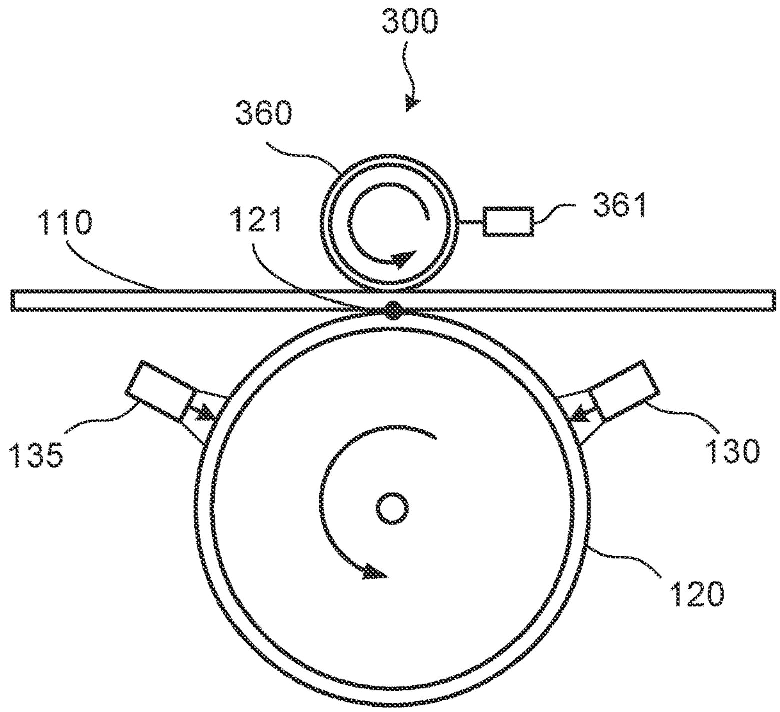
FIG. 3 shows a schematic drawing illustrating a printing system comprising a roller pressable against the photoconductive surface, according to an example of the present disclosure.

Referring now to FIG. 3, a printing system 300 comprising a roller 360 pressable against a photoconductive sleeve 120 is shown. The printing system 300 further comprises an intermediate transfer member 110, the photoconductive sleeve 120, a first light emitting member 130 for setting the photoconductive sleeve 120 at a pre-transfer voltage, and a second light emitting member 135 for setting the photoconductive sleeve 120 at a post-transfer voltage. As previously explained, the first and second light emitting members 130 and 135 modify a voltage value on the photoconductive sleeve 120 by emitting light towards the photoconductive sleeve 120.

As explained above, the printing system 300 may generate a printing fluid profile on the photoconductive sleeve 120. The printing fluid profile, once generated, is transferred to the intermediate transfer member 110. To effectively transfer the printing fluid profile from the photoconductive sleeve 120 to the intermediate transfer member 110, the roller 360 nips the intermediate transfer member 110 at an engagement point where the photoconductive sleeve 120 contacts the intermediate transfer member 110. In some examples, the roller 360 is pressable against the photoconductive sleeve 120 at the engagement point 121 and the roller 360 is electrically charged at a roller voltage greater than the post-transfer voltage. In FIG. 3, to electrically charge the roller 360, a voltage source 361 is connected to the roller 360. Examples of voltage sources 361 include batteries, generators, or other elements which deliver a constant voltage level. In an example, the voltage source 361 is an electric connection to the ground and the roller 360 is electrically charged at a null voltage. However, in other examples, the voltage source 361 may be set at a voltage different than zero.

In some examples, the intermediate transfer member 110 may be in the form of an endless loop intermediate transfer member having its ends joined by a splice. In some examples, the splice may be made of a different material than the intermediate transfer member 110. In some other examples, the intermediate transfer member 110 and the splice may have different electrical conductivity coefficients. In an example, the splice comprises a thermoplastic polyurethane (TPU) and the intermediate transfer member 110 may be made of several layers, including a fabric layer and at least one of a compressible layer, a conductive layer, a soft layer, and a coating layer. As a result of the different materials, the photoconductive sleeve 120 may be locally discharged based on the type of material of the intermediate transfer member 110 which the photoconductive sleeve 120 contacts at the engagement point 121 (i.e., the splice or the intermediate transfer member 110). In some examples, the ends of the intermediate transfer member 110 may be shaped such that the splice is zigzag-shaped. However, alternative shapes are possible, such as a splice having a slant shape or a splice perpendicular to the sides of the intermediate transfer member 110.

As explained above, there are several factors that may result in a non-uniformly charged photoconductive sleeve 120. Examples of factors include presence of foreign materials on the surface of the photoconductive sleeve 120, the presence of foreign materials on the intermediate transfer member 110, and different electrical conductivities across the intermediate transfer member 110. In some examples, the foreign materials present on the intermediate transfer member 110 and/or the photoconductive sleeve 120 may have different electrical properties. In other examples, a printing system may include multiple photoconductive sleeves to contact the intermediate transfer member 110 at different locations (for instance, a first and second contact location), and the foreign materials present on the intermediate transfer member at the second contact location may have been transferred to the intermediate transfer member 110 at the first contact location. However, the use of the second light emitting member 120 to set the photoconductive sleeve 120 at the post-transfer voltage compensates for the local discharges experienced upon contact of the photoconductive sleeve 120 and the intermediate transfer member 110, thereby reducing the image quality defects arising from non-uniformly charged photoconductive sleeves and reducing the variance of the voltage values across the photoconductive surface.

In some other examples, the printing system 100 may comprise components of printing systems 200 and 300. In an example, the printing system 100 may further comprise the drying station 240, the shading member 250 and the roller 360. In some examples, the printing system 100 may comprise an intermediate transfer member 110 in the form of an endless loop intermediate transfer member having its ends joined by a splice. As previously explained, the splice and the intermediate transfer member may be made of different materials or may have a different electric conductivity coefficient.

According to some examples, a printing system may comprise an intermediate transfer member, a plurality of photoconductive sleeves to contact the intermediate transfer member at respective engagement points, a plurality of first light emitting members and a plurality of second light emitting members. For each of the photoconductive sleeves of the printing system, a respective first light emitting member of the plurality of first light emitting members is to set a first segment of a rotation path associated to the respective photoconductive sleeve, the first segment being upstream of a respective engagement point at a pre-transfer voltage. Also, a respective second light emitting member of the plurality of second light emitting members is to set a second segment of the path of the respective photoconductive sleeve at a post-transfer voltage greater than the pre-transfer voltage. In some examples, a voltage difference between the pre-transfer voltage and the post-transfer voltage may be set such that an electrical arc is prevented at the respective engagement point and to compensate for the local discharge arising from contact between the respective photoconductive sleeve and the intermediate transfer member at the respective engagement point. In some examples, a plurality of shading members and a plurality of drying stations may be arranged such that to cure the intermediate transfer member as the intermediate transfer member moves along curing regions located in between engagement points. As previously explained, the shading members may be arranged such that to cover a shading segment of the photoconductive sleeve defined from the first segment in which the respective first light emitting member emits light thereon to the respective engagement point, thereby blocking radiation towards the photoconductive sleeve. In some examples, the shading members may be arranged to cover a region of the photoconductive sleeve defined from the engagement point to the second segment in which the respective second light emitting member emits light thereon.

According to some examples, a conditioning device may be used for reducing the local discharges arising from contact of a photoconductive surface with an intermediate transfer member. As previously explained, LEP printing systems generate printing fluid profiles on photoconductive surfaces by selectively charging/discharging regions of a photoconductive surface. In an example, a photoconductive surface (for instance, a photoconductive sleeve) is uniformly charged at a cleaning base voltage value (for instance, −300 V) before undergoing a cleaning operation in which the photoconductive surface is cleaned. Then, upon the surface being cleaned, the surface may be electrically charged to a reference base voltage value (for instance, −800 V). When having a photoconductive surface including a continuous photoconductive surface (for instance, a photoconductive sleeve movable along a continuous path), the photoconductive surface may be continuously charged at the cleaning base voltage value and the reference base voltage value. To keep the photoconductive surface within an admissible range of voltage values, a conditioning device comprises a first light emitting member to set a first segment of the path at a pre-transfer voltage and a second light emitting member a second segment of the path at a post-transfer voltage. As previously explained, the first segment on which the first light emitting member projects light is upstream an engagement point where the photoconductive surface contacts with an intermediate transfer member and the second segment on which the second light emitting member projects light is downstream the engagement point. In an example, the post-transfer voltage may correspond to the cleaning base voltage value.

Figure 4:
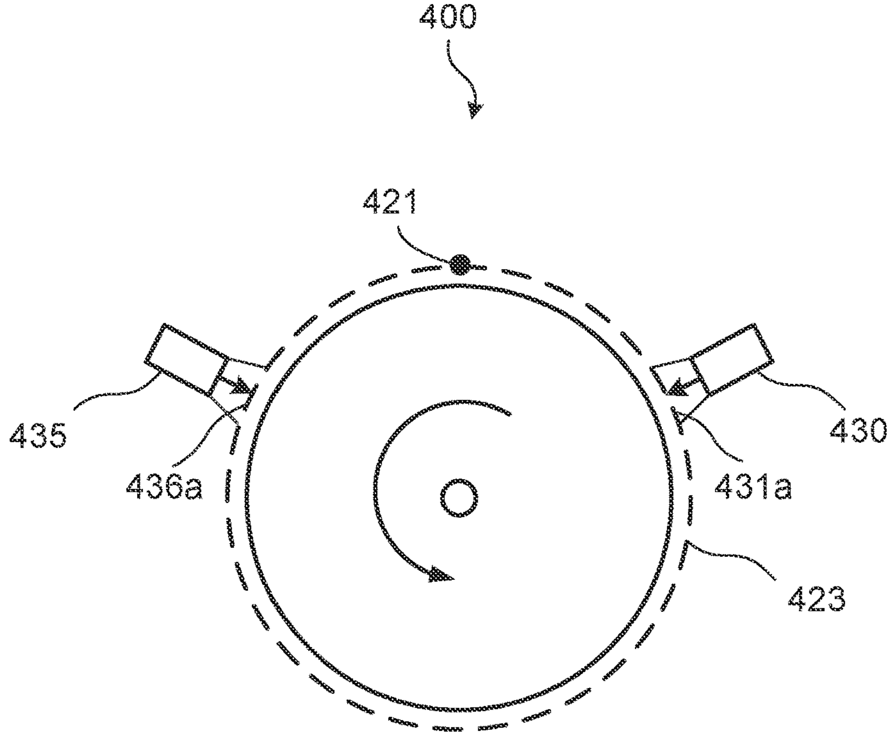
FIG. 4 shows a schematic drawing illustrating a conditioning device including a first light emitting member and a second light emitting member, according to an example of the present disclosure.

Referring now to FIG. 4, a conditioning device 400 for reducing local discharges in a photoconductive surface during a printing operation is shown. Examples of printing operations include a transfer operation in which a printing fluid profile on the photoconductive surface is transferred to an intermediate transfer member, a cleaning operation in which the photoconductive surface is cleaned, and maintenance operations. The conditioning device 400 comprises a first light emitting member 430 and a second light emitting member 435. Each of the light emitting members 430 and 435 is to emit light towards a respective segment of a continuous path 423. In FIG. 4, the continuous path 423 is represented in dashed lines and represents a physical trajectory of a photoconductive surface (not shown in FIG. 4). For instance, in the example of FIG. 4, the continuous path 423 is circular. However, in other examples, photoconductive surfaces of different continuous surfaces may be provided, and then, the continuous path 423 may be shaped in accordance with the photoconductive surface.

In the conditioning device 400, the first light emitting member 430 is to emit light towards a first segment 431*a* of the continuous path 423 and the second light emitting member 436 is to emit light towards a second segment 436*a* of the continuous path 423. The first segment 431*a* is located upstream an engagement point 421 at which the photoconductive surface is to contact an intermediate transfer member. The second segment 436*a* is located downstream the engagement point 421. As a result of the light emitted by the light emitting members 430 and 435, a voltage value on the photoconductive surface is modified. In particular, the light emitted by the first light emitting member 430 is to set the photoconductive surface at a pre-transfer voltage and the second light emitting member 435 is to set the photoconductive surface at a post-transfer voltage, being the post-transfer voltage greater than the pre-transfer voltage so as to compensate for the local discharges arising from contact at the engagement point 421.

In some examples, the first light emitting member 430 comprises a first plurality of light emitting elements and the second light emitting member 435 comprises a second plurality of light emitting elements. In an example, the light emitting elements may be light emitting diodes (LEDs). To set the first segment 431*a* at the pre-transfer voltage, the first plurality of light emitting elements emits a first amount of light associated with the pre-transfer voltage across a width of the photoconductive surface. To set the second segment 436*a* at the post-transfer voltage, the second plurality of light emitting elements emits a second amount of light associated with the post-transfer voltage across the width of the photoconductive surface. In some examples, the second amount of light has a greater light density than the first amount of light.

In some other examples, the pre-transfer voltage and the post-transfer voltage resulting from the light emitted by the first and second light emitting members 430 and 435 may be associated with an input voltage of the light emitting members 430 and 435. In an example, the first light emitting member 430 is to receive an input voltage within a range from 17 to 20 V and the second light emitting member 435 is to receive an input voltage greater than 24 V. In some examples, the first light emitting member 430 and the second light emitting member 435 are to emit a light intensity within a range 400 to 1000 W/cm$^2$, being the second light intensity greater than the first light intensity. In some examples, the second light intensity may be greater than 500 μW/cm$^2$.

Figure 5:
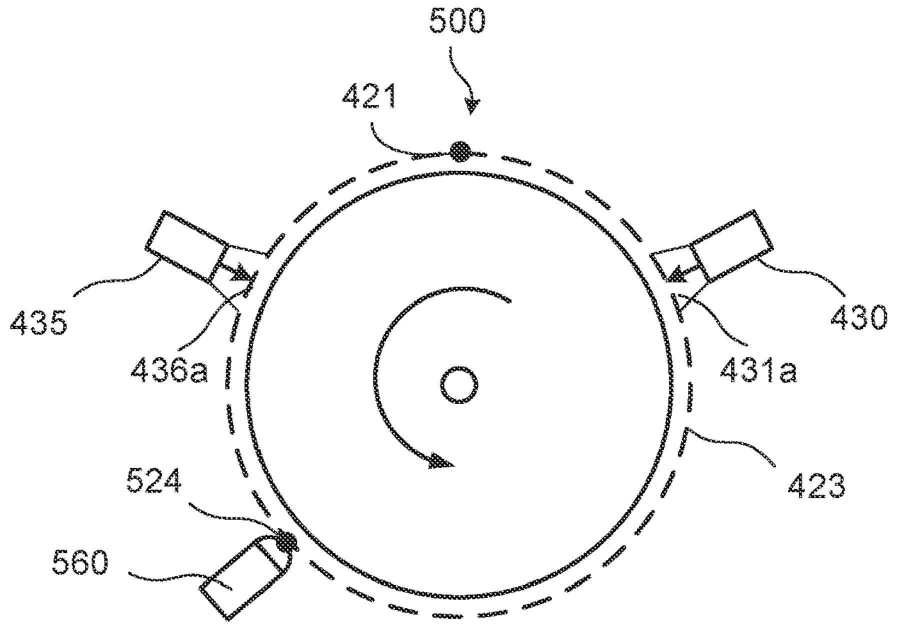
FIG. 5 shows a schematic drawing illustrating a conditioning device including a charging roller, according to an example of the present disclosure.

Referring now to FIG. 5, a conditioning device 500 including a charging roller 560 is shown. The conditioning device 500 further comprises a first light emitting member 430 and a second light emitting member 435. The charging roller 560 is arranged to contact a photoconductive surface at a third segment 524 of a continuous path 423, the third segment 524 located upstream the first segment 431*a* of the continuous path 423 and downstream the second segment 436*a* of the continuous path 423. The charging roller 560 comprises a rotatable metal core roller arranged to lie on the photoconductive surface and is rotated by friction.

In the conditioning device 500 of FIG. 5, the charging roller 560 is to set the photoconductive surface at a reference voltage lower than the pre-transfer voltage. In an example, the charging roller 560 may set the photoconductive surface at −800 V. However, in other examples, other voltage values may be possible, such as −900 V and −750 V. In some examples, to electrically charge the portion of charging roller 560 that engages with the photoconductive surface, the charging roller 560 further comprises a balancing roller to balance the current on the charging roller 560.

In some examples, the first light emitting member 430 of the conditioning device 500 is to set a photoconductive surface at a pre-transfer voltage within a range from −350 V to −320 V, the second light emitting member 435 is to set the photoconductive surface at a post-transfer voltage within a range defined from −310 to −280 V, and the charging roller 560 is to set the photoconductive surface at a reference voltage value within a voltage value lower than −500 V (for instance, a voltage value of −800 V).

Figure 6:
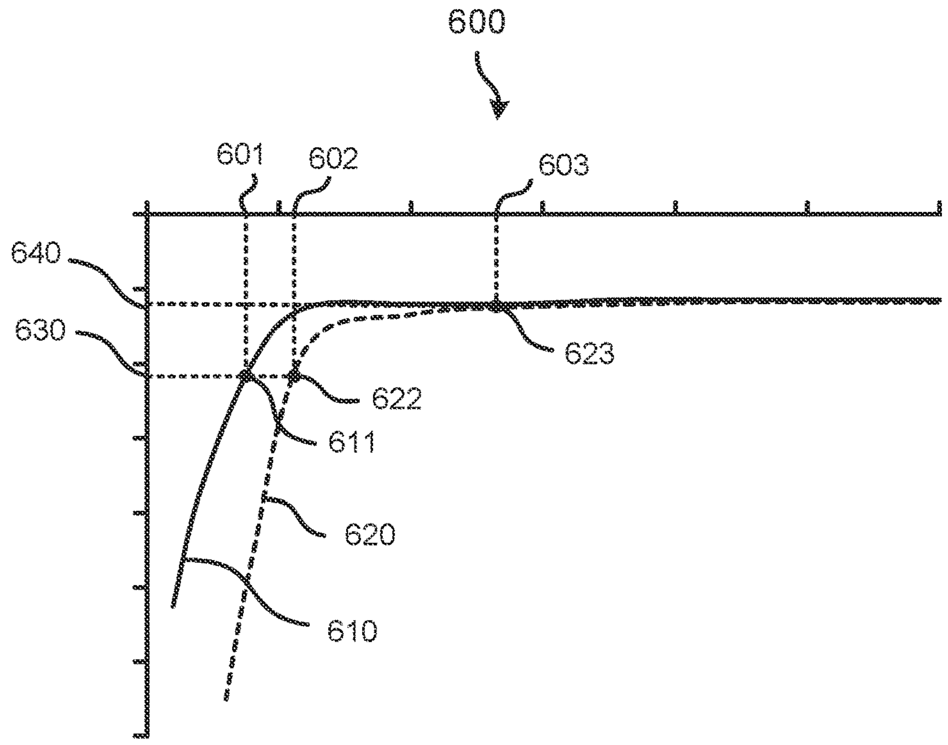
FIG. 6 shows a chart representing a voltage on the photoconductive surface based on an input voltage received by a light emitting member, according to an example of the present disclosure.

Referring now to FIG. 6, a chart 600 representing voltages values on a region of a photoconductive surface over a range of input values of a light emitting member is shown. The Y-axis of chart 600 represents a voltage on a photoconductive surface and the X-axis represents an input voltage of a light emitting member (for instance, the first light emitting members 130, 430 and the second light emitting members 135, 435). The region of the photoconductive surface may correspond, for instance, to a region on an external surface of a photoconductive surface (e.g., photoconductive region 122) moving through one of the first segment 131*a*, 431*a* and the second segment 136*a*, 436*a* of a path associated with a photoconductive surface (e.g., continuous path 423), as previously explained in FIGS. 1 to 5. In an example, the voltage on the region of the photoconductive surface may be measured using an electrometer. Chart 600 represents a first voltage data 610 in solid line and a second voltage data 620 in dashed line. The first voltage data 610 corresponds to voltage measurements when the photoconductive surface receives radiation emitted by a drying station and the second voltage data 620 represents voltage measurements when using a shading member (for instance, shading member 250) to block radiation towards a shading segment of the path associated to the photoconductive surface. In an example, the shading segment may be defined from the first segment of the path (e.g., the first segment 131*a*, 431*a*) to the engagement point (e.g., engagement point 121, 421) where the photoconductive surface is to contact with the intermediate transfer member.

In chart 600, a first horizontal dashed line represents a pre-transfer voltage value 630 and a second horizontal dashed line represents a post-transfer voltage value 640. As explained above, the post-transfer voltage value 640 at which the second light emitting member sets the photoconductive surface is greater than the pre-transfer voltage value 630 at which the first light emitting member sets the photoconductive surface. Hence, the input voltages for the light emitting members are set such that the input voltage of the second light emitting members is greater than the first light emitting member. In an example, the pre-transfer voltage value 630 may be a voltage within a range from −350 V to −320 V and the post-transfer voltage value 640 may be 60 V greater than the pre-transfer voltage.

The first horizontal dashed line associated with the pre-transfer voltage value 630 intersects the first voltage data 610 and the second voltage data 620 at a first point 611 and at a second point 622, respectively. At the first point 611, the input voltage of the light emitting member is a first input voltage 601. At the second point 622, the input voltage is a second input voltage 602 greater than the first input voltage 601. In other words, when radiation or convection generated by a drying station reaches the photoconductive surface, the input voltage for setting the photoconductive surface at the pre-transfer voltage is lower. In an example, when the pre-transfer voltage value 630 is a voltage within a range from −350 V to −320 V, the first input voltage 601 and the second input voltage 602 are a voltage within a range from 17 V to 20 V.

The second horizontal dashed line associated with the post-transfer voltage value 640 intersects the first voltage data 610 and the second voltage data 620 at a third point 623. At the third point 623, the input voltage of the light emitting member is a third input voltage 603, the third input voltage 603 being greater than the first input voltage 601 and the second input voltage 602. However, due to the first voltage data 610 and the second voltage data 620 are substantially flat for voltage values greater than the third input voltage 603, other input voltages for setting the photoconductive surface at the post-transfer voltage value 640 are possible. In an example, the third input voltage 603 may be a voltage value greater than 24 V.

Although in chart 600 the second horizontal line associated with the post-transfer value 640 intersects the first voltage data 610 and the second voltage data 620 at the third point 623, in other examples, the second horizontal line may intersect the first voltage data 610 and the second voltage data at different input voltages. However, it should be noted that, as the input voltage increases, the voltage differences between the first voltage data 610 and the second voltage data 620 are reduced.

Figure 7:
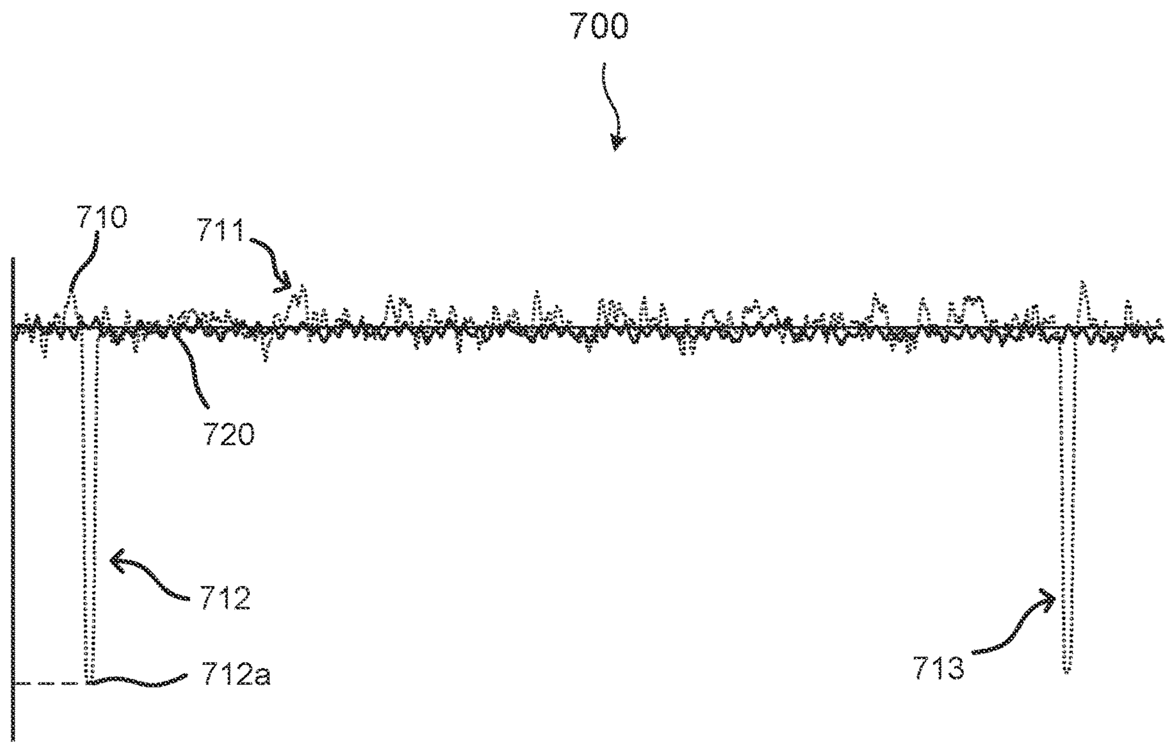
FIG. 7 shows a chart representing voltages values after mean reduction over a period of time, according to an example of the present disclosure.

Referring now to FIG. 7, chart 700 representing a first set of voltage values 710 and a second set of voltage values 720 over a period of time is shown. The voltage values correspond to voltage values measured on a region of a photoconductive surface (e.g., photoconductive region 122). In an example, the voltage may be measured using an electrometer. The X-axis represents a time period and the Y-axis represents voltage values after mean reduction for each of the first and second set of voltage values 710 and 720. The first set of voltage values 710 corresponds to voltage values obtained when the second light emitting member (for instance, the second light emitting members 135, 435) is turned off and the first light emitting member (for instance, the first light emitting members 130, 430) sets the photoconductive surface at the post-transfer voltage (e.g., −300 V). In other words, instead of setting the photoconductive surface at the pre-transfer voltage with the first light emitting member and at the post-transfer voltage using the light emitting member, the first light emitting members sets the photoconductive surface directly at the post-transfer voltage. On the other hand, the second set of voltage values 710 corresponds to the voltage value on the photoconductive surface when the first light emitting member (for instance, the first light emitting members 130, 430) sets the photoconductive surface at the pre-transfer voltage (e.g., a voltage within a range from −350 V to −320 V) and the second light emitting member (for instance, the second light emitting members 135, 435) sets the photoconductive surface at the post-transfer voltage (e.g., −300 V). As previously explained in the description, setting the photoconductive surface at the post-transfer voltage after the engagement point (for instance, engagement point 121) where the photoconductive surface (for instance, the photoconductive sleeve 120) contacts an intermediate transfer member (for instance, the intermediate transfer member 110) reduces the local discharges compared to setting the photoconductive surface at the same post-transfer voltage value prior to contacting the intermediate transfer member at the engagement point.

Comparing the first set of voltage values 710 to the second set of voltage values 720, the first set of voltage values 710 has a greater variance than the second one. In particular, the first set of voltage values 710 includes a peak region 711 in which the voltage value reaches a local maximum, a first valley region 712 and a second valley region 713 in which the photoconductive surface experiences a local discharge. In the first valley region 712, the first set of voltage values 710 reaches a local minimum 712*a*. On the other hand, the second set of voltage values 720 moves within a smaller range of values compared to the range of values of the first set of voltage values 710, thereby leading to lower variance.

As explained above, the local discharges may be associated with the presence of foreign materials in at least one of the intermediate transfer member and the photoconductive surface or with a contact of a splice made of a different material than the intermediate transfer member with the photoconductive surface. In other words, the valleys regions 712 and 713 may be associated with at least one of the above-mentioned factors. However, when using the first and second light emitting members for setting the photoconductive surfaces at the pre-transfer voltage and the post-transfer voltage (i.e., the second set of voltage values 720), the local discharges are reduced. In some examples, the local minimum associated with the local discharge of the photoconductive surface may be a voltage within a range from −50 V to −20 V.

Figure 8:
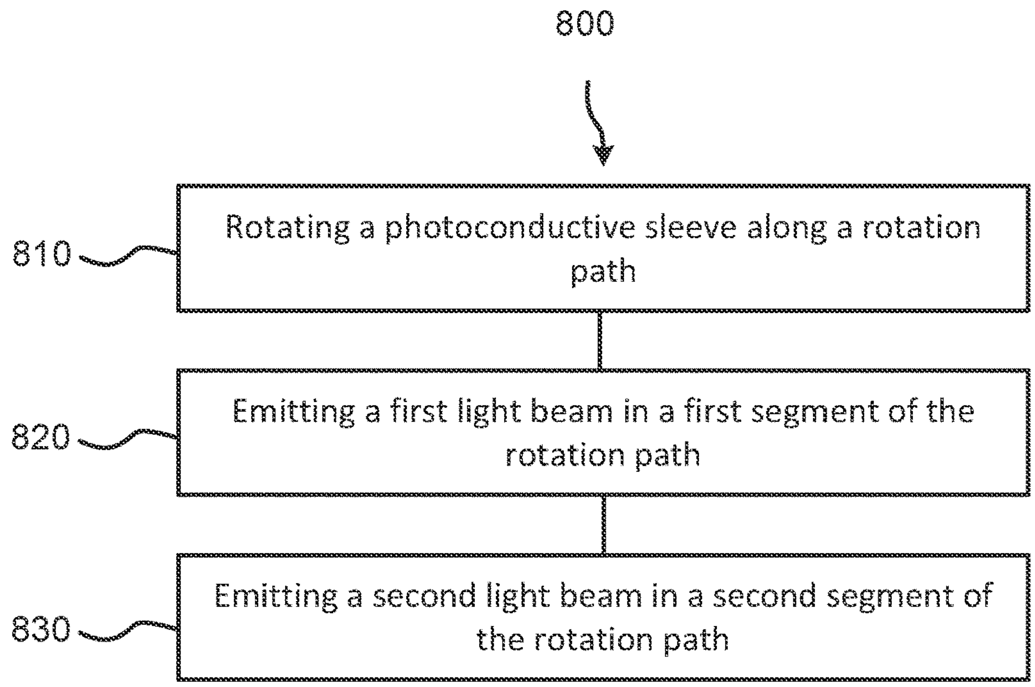
FIG. 8 shows a method for reducing local discharges in a photoconductive sleeve, according to an example of the present disclosure.

Referring now to FIG. 8, a method 800 for reducing local discharges in a photoconductive sleeve is shown. The method 800 may be carried out using printing systems 100, 200 and 300 and conditioning devices 400 and 500. At block 810, method 800 comprises rotating a photoconductive sleeve along a rotation path. In other examples, when having a continuous photoconductive surface, block 810 may comprise moving a photoconductive surface along a continuous path. At block 820, method 800 comprises emitting a first light beam in a first segment of the rotation path, the first segment being upstream an engagement point in which the photoconductive sleeve contacts with an intermediate transfer member. In an example, the first light beam may be emitted using a first light emitting member. Then, at block 830, method 800 comprises emitting a second light beam in a second segment of the path, the second segment being downstream the engagement point. Then, as the photoconductive sleeve rotates, the first light beam emitted at block 820 sets a region of the photoconductive sleeve (e.g., photoconductive region 122) moving through the first segment at a pre-transfer voltage and the second light beam emitted at block 820 sets the region of the photoconductive sleeve moving through the second segment at a post-transfer voltage greater than the pre-transfer voltage. In an example, the first segment corresponds to the first segment 131*a* and the second segment corresponds to the second segment 136*a*.

In an example, emitting a first light beam in a first segment of rotation path at block 820 comprises emitting a first light intensity and emitting the second light beam in a second segment at block 830 comprises emitting a second light intensity greater than the first light intensity, the second light intensity being greater than 500 μW/$cm^2$.

In some examples, emitting the first light beam in a first segment at block 820 comprises setting a first light emitting member (for instance, a first light emitting member 130, 430) at a first input voltage within a range from 17 to 20 V, the first light emitting member arranged to emit the first light beam in the first segment and emitting the second light beam in a second segment at block 830 comprises setting a second light emitting member (for instance, a second light emitting member 135, 435) at a second input voltage greater than 24 V, the second light emitting member arranged to emit the second light beam in the second segment.

In some other examples, method 800 further comprises setting a roller at a threshold voltage value greater than the post-transfer voltage and pressing the roller against the photoconductive sleeve at the engagement point.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims (and their equivalents) in which all terms are meant in their broadest reasonable sense unless otherwise indicated.

What is claimed is:

1. A conditioning device comprising:

a first light emitting member to emit light towards a photoconductive surface movable along a continuous path, the first light emitting member to emit light towards a first segment of the path located upstream an engagement point of the continuous path at which the photoconductive surface is to contact an intermediate transfer member; and a second light emitting member to emit light towards the photoconductive surface, the second light emitting member to emit light towards only a second segment of the path located downstream the engagement point, wherein the light emitted by the first light emitting member is to set the photoconductive surface at a pre-transfer voltage and the light emitted by the second light emitting member is to set the photoconductive surface at a post-transfer voltage greater the pre-transfer voltage.

2. The device of claim 1, further comprising:

a charging roller to contact the photoconductive surface at a third segment of the path, the third segment located upstream the first segment and downstream the second segment, wherein the charging member is to set the photoconductive surface at a reference voltage lower than the pre-transfer voltage.

3. The device of claim 1, wherein:

the first light emitting member comprises a first plurality of light emitting elements to emit a first amount of light associated with the pre-transfer voltage across a width of the photoconductive surface, the second light emitting member comprises a second plurality of light emitting elements to emit a second amount of light associated with the post-transfer voltage light across the width of the photoconductive surface.

4. The device of claim 1, wherein the first light emitting member is to receive an input voltage within a range from 17 to 20 V and the second light emitting member is to receive an input voltage greater than 24 V.

5. The device of claim 4, wherein the first light emitting member is to emit a first light intensity and the second light emitting member is to emit a second light intensity greater than the first light intensity, wherein the first and second light intensities are within a range from 400 to 1000 μW/cm2.

6. A printing system comprising:

an intermediate transfer member;

a photoconductive sleeve arranged to contact the intermediate transfer member at an engagement point;

a first light emitting member arranged to project light onto a first segment of a path for rotation of the photoconductive sleeve, the first segment of the photoconductive sleeve located upstream the engagement point; and a second light emitting member arranged to project light onto only a second segment of the path, the second segment located downstream the engagement point, wherein as the photoconductive sleeve rotates along the path, the first light emitting member is to set a photoconductive region of the photoconductive sleeve at a pre—transfer voltage and the second light emitting member is to set the photoconductive region at a post-transfer voltage greater than the pre-transfer voltage.

7. The printing system of claim 6, wherein the first light emitting member comprises a first plurality of light emitting diodes to receive a first input voltage and the second light emitting member comprises a second plurality of light emitting diodes to receive a second input voltage, the second input voltage being greater than the first input voltage.

8. The printing system of claim 6, further comprising:

a drying station to cure the intermediate transfer member as the intermediate transfer member moves along a curing region; and a shading member to cover a shading segment defined from the first segment of the path to the engagement point, the shading member to block radiation emitted by the drying station towards the photoconductive sleeve.

9. The printing system of claim 6, further comprising a roller pressable against the photoconductive sleeve at the engagement point, the roller being electrically charged at a roller voltage greater than the post-transfer voltage.

10. The printing system of claim 6, wherein a voltage difference between the post-transfer voltage and the pre-transfer voltage is less than 60 V.

11. The printing system of claim 10, wherein the pre-transfer voltage is a voltage within a range from −350V to −320V.

12. A method comprising:

rotating a photoconductive sleeve along a rotation path;

emitting a first light beam in a first segment of the rotation path, the first segment being upstream an engagement point in which the photoconductive sleeve contacts with an intermediate transfer member; and emitting a second light beam only in a second segment of the rotation path, the second segment being downstream the engagement point, wherein as the photoconductive sleeve rotates, the first light beam sets a region of photoconductive sleeve moving through the first segment at a pre-transfer voltage and the second light beam sets the region of the photoconductive sleeve moving through the second segment at a post-transfer voltage greater than the pre-transfer voltage.

13. The method of claim 12, wherein emitting the first light beam comprises emitting a first light intensity and emitting the second light beam comprises emitting a second light intensity greater than the first light intensity, the second light intensity being greater than 500 μW/cm2.

14. The method of claim 12, wherein:

emitting the first light beam comprises setting a first light emitting member at a first input voltage within a range from 17 to 20 V, the first light emitting member arranged to emit the first light beam in the first segment, and emitting the second light beam comprises setting a second light emitting member at a second input voltage greater than 24 V, the second light emitting member arranged to emit the second light beam in the second segment.

* * * * *